United States Patent
Lee et al.

(10) Patent No.: US 12,326,940 B2
(45) Date of Patent: Jun. 10, 2025

(54) GRAPH EXPLORATION FRAMEWORK FOR ADVERSARIAL EXAMPLE GENERATION

(71) Applicant: International Business Machines Corporation, Armonk, NY (US)

(72) Inventors: Taesung Lee, Ridgefield, CT (US); Kevin Eykholt, White Plains, NY (US); Douglas Lee Schales, Ardsley, NY (US); Jiyong Jang, Chappaqua, NY (US); Ian Michael Molloy, Westchester, NY (US)

(73) Assignee: International Business Machines Corporation, Armonk, NY (US)

( * ) Notice: Subject to any disclaimer, the term of this patent is extended or adjusted under 35 U.S.C. 154(b) by 450 days.

(21) Appl. No.: 17/536,059

(22) Filed: Nov. 28, 2021

(65) Prior Publication Data

US 2023/0169176 A1 Jun. 1, 2023

(51) Int. Cl.
*G06F 21/57* (2013.01)
*G06N 3/04* (2023.01)

(52) U.S. Cl.
CPC ............. *G06F 21/577* (2013.01); *G06N 3/04* (2013.01); *G06F 2221/033* (2013.01)

(58) Field of Classification Search
CPC . G06F 21/577; G06F 2221/033; G06N 20/00; G06N 5/01; G06N 5/022; G06N 7/01; G06N 3/04; G06N 3/045; G06N 3/047; G06N 3/08; G06N 3/088
See application file for complete search history.

(56) References Cited

U.S. PATENT DOCUMENTS

| | | | |
|---|---|---|---|
| 10,862,926 B2 | 12/2020 | Linn | |
| 10,936,973 B1 | 3/2021 | Wang | |
| 11,551,137 B1* | 1/2023 | Echauz | G06F 21/554 |
| 11,568,282 B2* | 1/2023 | Chen | G06N 3/08 |
| 11,671,436 B1* | 6/2023 | Xu | G06F 18/24 726/22 |
| 12,067,857 B1* | 8/2024 | Shah | G08B 21/02 |
| 2019/0130110 A1* | 5/2019 | Lee | G06N 3/08 |
| 2019/0188562 A1* | 6/2019 | Edwards | G06N 5/045 |
| 2020/0059481 A1* | 2/2020 | Sekar | H04L 63/1425 |
| 2020/0177618 A1* | 6/2020 | Hassanzadeh | G06F 21/552 |
| 2020/0226425 A1* | 7/2020 | Zhang | G06F 18/217 |
| 2021/0011757 A1 | 1/2021 | Duesterwald | |
| 2021/0034737 A1* | 2/2021 | Khan | G06F 21/554 |

(Continued)

FOREIGN PATENT DOCUMENTS

CN 111275106 A * 6/2020 ........... G06K 9/6268

OTHER PUBLICATIONS

Jaeckle et al. Generating Adversarial Examples with Graph Neural Networks (Year: 2021, Month: May).*

(Continued)

*Primary Examiner* — Mohammad A Siddiqi
(74) *Attorney, Agent, or Firm* — Eric W. Chesley

(57) ABSTRACT

A processor-implemented method generates adversarial example objects. One or more processors represent an adversarial input generation process as a graph. The processor(s) explore the graph, such that a sequence of edges on the graph are explored. The processor(s) create, based on the exploring, an adversarial example object, and utilize the created adversarial example object to harden an existing process model against vulnerabilities.

17 Claims, 10 Drawing Sheets

(56) References Cited

U.S. PATENT DOCUMENTS

| | | | | |
|---|---|---|---|---|
| 2021/0049505 | A1* | 2/2021 | Wang | G06N 20/00 |
| 2021/0067549 | A1* | 3/2021 | Chen | G06N 3/084 |
| 2021/0097176 | A1* | 4/2021 | Mathews | G06N 5/01 |
| 2021/0105294 | A1* | 4/2021 | Kruse | H04L 63/145 |
| 2021/0166122 | A1* | 6/2021 | Wu | G06N 3/045 |
| 2021/0352095 | A1* | 11/2021 | Cam | G06N 7/01 |
| 2022/0004875 | A1* | 1/2022 | Koike-Akino | G06N 3/047 |
| 2022/0100867 | A1* | 3/2022 | Sinn | G06N 3/082 |
| 2022/0277173 | A1* | 9/2022 | He | G06N 3/0475 |
| 2022/0309179 | A1* | 9/2022 | Payne | G06F 21/31 |
| 2022/0335574 | A1* | 10/2022 | Tang | G06V 10/806 |
| 2023/0085509 | A1* | 3/2023 | Noel | H04L 63/20 726/25 |
| 2023/0334332 | A1* | 10/2023 | Wu | G06V 10/761 |

OTHER PUBLICATIONS

A Novel System to Robustify Deep Neural Networks by Distributed Adversarial Training, IPCOM000266027D, Jun. 8, 2021.

Adversarial EXEmples: A Survey and Experimental Evaluation of Practical Attacks on Machine Learning for Windows Malware Detection, Demetrio et al., University of gegli studi de Cagaliari, ITA, 2017.

Conditional Structure Generation through Graph Variation Generative Adversarial Nets, Yang et al., University of Illinois at Urbana Champaign, 2019.

Cyber Security Threat Modeling Based on the MITRE Enterprise Attack Matrix, Xiong et al., Software and Systems Modeling, Jun. 2021.

Method and System for Providing a Deep Generative Adversarial Learning Framework for Solving Multi-Label Classification with Imbalanced Dataset, Lu et al., IPCOM000264331D, Dec. 3, 2020.

Subgraph-based Adversarial Examples Against Graph-based IoT Malware Detection Systems, Ahmed Abusnaina et al., University of Central Florida, 2018.

System and Method to Test and Build Robust Classification Models by Generating Intelligent Adversarial Samples Using Domain Knowledge, IPCOM000259986D, Oct. 6, 2019.

NIST, Definition of Cloud Computing, Peter Mell et al., Sep. 2011.

Anderson, et al., "Evading Machine Learning Malware Detection", Black Hat USA 2017, Jul. 22-27, 2017, Las Vegas, NV, USA, 6 pgs.

* cited by examiner

GRAPH EXPLORATION FRAMEWORK FOR ADVERSARIAL EXAMPLE GENERATION

STATEMENT REGARDING FEDERALLY SPONSORED RESEARCH OR DEVELOPMENT

This invention was made with Government support under Contract No. W912CG19C0003 awarded by the Defense Advanced Research Projects Agency (DARPA). The Government has certain rights in this invention.

BACKGROUND

The present invention relates to adversarial example objects. Still more specifically, one or more embodiments of the present invention relates to generating adversarial example objects.

Machine learning models are vulnerable to adversarial evasion attacks. As such, an understanding such attacks is critical in order to ensure the safety and security of critical Artificial Intelligence (AI) tasks. However, most adversarial attacks are difficult to deploy against a majority of AI systems due to fundamental issues in design. Images are unlike most other input types as they are composed of continuous, numerical, and independent features. Adversarial attacks, as a result, have been designed in the prior art with such feature properties in mind, but inputs to most AI systems are often varied in representation and may be comprised of multiple data types that are neither continuous, numerical, nor independent. Furthermore, some input types used in the prior art include additional semantic and functional constraints that must be observed to generate realistic adversarial inputs. As such, adversarial modifications of a binary executable cannot remove library imports critical to successful execution. Prior works that address this issue are limited in scope, only able to attack an intermediate feature representation, or only designed for specific task domains, such as malware detection.

SUMMARY

In one or more embodiments of the present invention, a method generates adversarial example objects. One or more processors represent an adversarial input generation process as a graph. The processor(s) explore the graph, such that a sequence of edges on the graph are explored. The processor (s) create, based on the exploring, an adversarial example object, and utilize the created adversarial example object to harden an existing process model against vulnerabilities.

In one or more embodiments of the present invention, the created adversarial example object is an object that is created directly from the exploring the graph.

In one or more embodiments of the present invention, the created adversarial example object is a new object that is created by comparing the created adversarial example object to an independently computed target adversarial example object.

In one or more embodiments of the present invention, the created adversarial example object and the independently computed target adversarial example object are expressed as vectors, and the method further comprises utilizing an input scoring function to compare the created adversarial example object to the independently computed target adversarial example object, where the input scoring function compares feature vector similarities between the created adversarial example object to the independently computed target adversarial example object.

In one or more embodiments of the present invention, the further comprises utilizing an input scoring function to compare the created adversarial example object to the independently computed target adversarial example object, wherein the input scoring function utilizes losses of nodes in the graph.

In one or more embodiments of the present invention, edges of the graph are weighted according to a likelihood of creating an adversarial example object.

In one or more embodiments of the present invention, the method further comprises using the adversarial example object to train a machine learning process.

In one or more embodiments of the present invention, the adversarial example object is an adversarial cybersecurity object.

In one or more embodiments of the present invention, the method(s) described herein are performed by an execution of a computer program product on a computer system.

DETAILED DESCRIPTION

Figure 1:
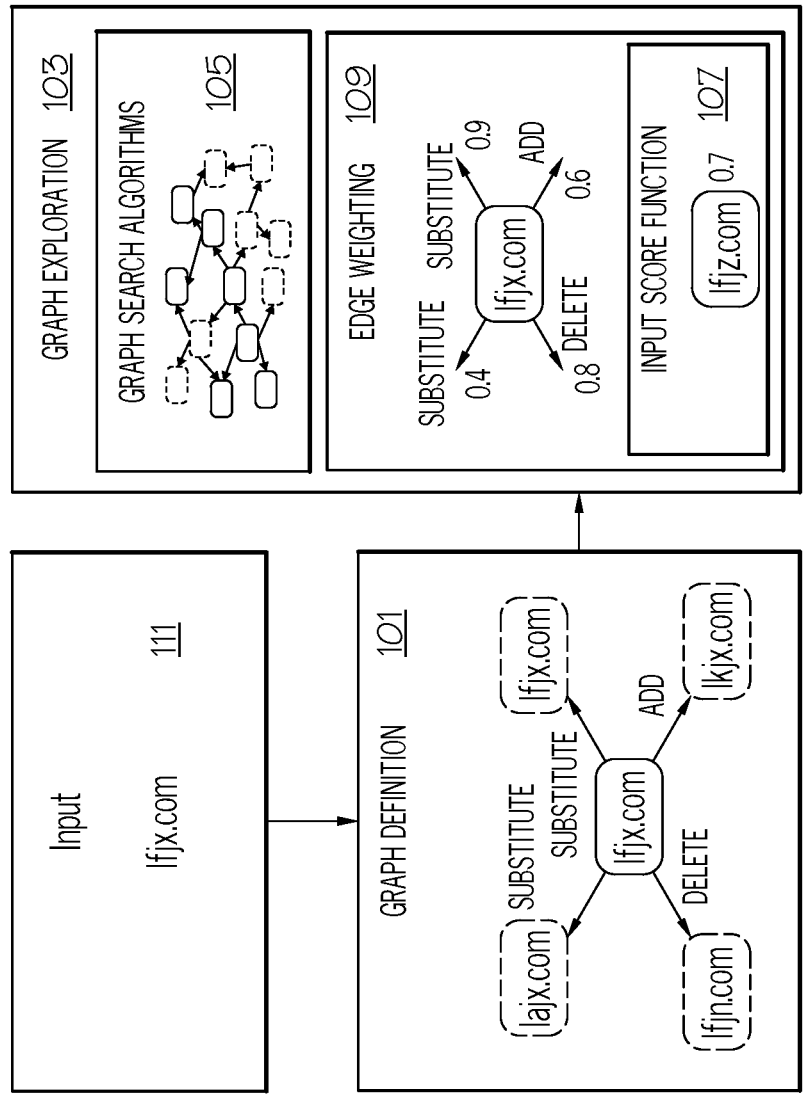
FIG. 1 presents an overview of one or more embodiments of the present invention.

One or more embodiments of the present invention provide a new framework to enable the generation of adversarial inputs (e.g., adversarial examples, also referred to herein interchangeably as adversarial objects and/or adversarial example objects) irrespective of the input type and task domain. Given an input and a set of pre-defined input transformations, one or more embodiments of the present invention discovers a sequence of transformations that result in a semantically correct and functional adversarial input (e.g., an input that appears similar to another input, but actually describes a different entity, concept etc.). The present patent application demonstrates the generality of this new approach provided by one or more embodiments of the present invention on several diverse machine learning tasks with various input representations. Also discussed herein is the importance of generating adversarial examples as they further the understanding of model behavior and enable the deployment of mitigation techniques.

The powerful automation capabilities of AI have been adopted to empower and drive numerous data-driven tasks.

However, the safety, security, and privacy of machine learning has become a concerning issue. In particular, adversarial machine learning, which studies how small perturbations on the input by active adversaries can predictably influence model behavior, indicates that use of AI in safety and security critical tasks such as cybersecurity may introduce new vulnerabilities into the system.

To secure machine learning algorithms against adversarial attacks, penetration testing of victim models is required to identify vulnerabilities and obtain a representative set of adversarial inputs. Recent studies in adversarial machine learning has developed numerous attack algorithms. Such algorithms are mainly developed for image classifiers in various settings, including permissive models, prohibited models, and adaptive attacks to defenses. However, many of these attacks are impractical for real systems, since they were designed using image classification tasks. Image inputs are relatively simple as they are often a collection of continuous, numerical, and independent features. Furthermore, the feature extraction process is often differentiable, which is a key requirement for many adversarial machine learning methods as most attacks backpropagate a loss gradient through the classification pipeline to identify adversarial input manipulations. Many machine learning models use inputs with different characteristics than images.

In other non-image input domains such as cybersecurity, some or all of the aforementioned properties may not be true. For example, in domain generation algorithm (DGA) detection and malware detection, the raw input is likely to be an arbitrary discrete object (e.g., a string or binary file) and the feature representation may be a combination of discrete, continuous, and categorical values (e.g., total length, library imports, file type). Thus, adversarial machine learning attacks, which seek to apply fractional changes to the feature representation cannot be realized as such modifications can only be performed on continuous features. Furthermore, deriving and applying the change to the original input object poses more problems. As the feature extraction process converts an abstract input object into a vector of discrete and continuous numerical values, the feature extraction process is often non-differentiable. In some tasks, certain extracted features may also depend on or be constrained by other features (e.g., the number of vowels in a domain name cannot be greater than the total length). Finally, when considering adversarial modifications to the input object or its corresponding feature representation, semantic correctness and functionality should be maintained to ensure the generated adversarial example is realizable. For example, the adversarial generation process should not remove library imports from a malicious binary that would break execution logic and successful operation of the malware. While one or more embodiments of the present invention are presented in the context of cybersecurity, as their use of machine learning algorithms demand the algorithms be safe and secure, the aforementioned issues exist for other machine learning tasks as well.

These strict input assumptions are often only fulfilled in the feature space as the classifier input often must be numerical. Thus, adversarial attack and defenses are restricted to image or other similar inputs. Adversarial training, for example, requires the generation of adversarial inputs during the training process and then trains the model on the adversarial inputs rather than the original dataset. Although adversarial input features can be generated for a task, as stated above, the generation process does not guarantee the semantic correctness and functionality of the input. As such, the generated features, while causing the classifier to change its prediction, may not be representative of a valid input object. This could affect the effective of the defenses, since often adversarial training on such unrealistic adversarial features generated by traditional adversarial attacks is an ineffective defense against functional and semantically correct adversarial input objects generated.

One approach to enable adversarial attacks for non-image domain tasks involves retooling existing image-based adversarial attacks to enforce additional domain specific constraints that ensure the functional and semantic correctness of the generated samples. As existing image-based adversarial attacks assume a numerical input, adversarial attacks can be performed on the feature representation of an input object as it is necessarily numerical so the classifier can process it. However, this approach cannot propagate adversarial gradients back to the input objects due to the non-differentiable mapping of input objects to numerical features. Additional steps are required to generate adversarial example objects.

Another approach to enable adversarial attacks for non-image domain tasks is to pick a task domain and define a domain specific set of functionality preserving input transformations on the input object. These transformations define the basic manipulation operations used to craft adversarial examples during the attack process replacing the traditional addition and subtraction of adversarial noise to a real valued input. As transformations are performed directly on the object rather than the object's feature representation, the feature extraction process is abstracted away removing the problem of non-differentiable feature extraction. Performing transformations on the adversarial input directly also allows the generated samples to be used for analysis and remediation and makes the attack resilient to gradient obfuscation defenses. However, the existing works employing this approach are varied in their attack methodology. Each employs a custom attack algorithm to generate adversarial samples, which makes it difficult to adapt these works to other domains.

Thus, one or more embodiments of the present invention utilize a new and useful general purpose adversarial attack framework for AI systems and implement a prototype toolkit that is used to empower model testing, analysis, and adversarial remediation. That is, one or more embodiments of the present invention expose a transformation interface with which a user can define a set of functionality and semantic preserving transformations. These user defined transformations establish the basic adversarial modification operations. Thus, one or more embodiments of the present invention characterize the adversarial input generation process as a graph exploration problem. Given an initial unperturbed sample, the novel framework presented herein finds a sequence of edges (i.e., sequence of transformations) that achieve the adversarial example objective (i.e., misclassification) and generates an adversarial input. Unlike prior work, this presently-presented new characterization of the attack process as a graph exploration problem and transformation interface supports any machine learning task and transformation type. This formalization also enables a system/user to leverage search algorithms that are applicable to a graph such as beam search or depth first search, and both traditional and graph-based search constraints such as Lp norm and the path length.

As such, one or more embodiments of the present invention utilizes a novel framework that consists of three main components: 1) Vertex Scoring, 2) Graph exploration, and 3) Edge weighting. Based on the needs of the user, these components tune each of these components to support different complexity, running time, and attack success rate requirements. In one or more embodiments of the present invention, custom input constraints and inter-feature dependencies are also be defined, which the herein-disclosed framework automatically enforces during sample generation. This framework can address the lack of a general purpose tool to generate adversarial samples, and still exposes an interface that can reuse prior adversarial attack algorithms to guide exploration. In one or more embodiments of the present invention, this ensures backwards compatibility with existing approaches.

As such, one or more embodiments of the present invention presents a general purpose adversarial input generation framework that formulates the process as a graph exploration problem in order to generate adversarial inputs irrespective of the input representation. Unlike the prior art, which is limited in scope or focused on proposing brand new attacks, the presently-presented framework acts as a new platform to support the study of adversarial attacks for any machine learning (ML) task. Three demonstrations on different ML task domains with varied input representations are discussed herein, which highlight the functionality of the framework and explore various use cases that the framework enables.

As used herein, the following terminology is described as:

Object: An object denotes the input value to the AI system before feature extraction has occurred. An object can be a singular data type or a collection of data types. A data type could be an abstract data type (e.g., domain name or binary) or a common data type (e.g., numerical, categorical, and textual data).

Feature: A feature denotes the input value to the machine learning model after feature extraction has been performed, and it is a numerical value such as a real number or integer. A feature vector is composed of one or more features. The terms features and feature vector are used interchangeably herein.

Input: An input denotes a value anywhere be the model's input (i.e., either an object or a feature vector).

Using the above terminology, a typical AI system consists of a feature extractor and a machine learning model. Given an object of a known structure, the system first converts the object into a numerical representation recognized by the machine learning model, optionally normalizing the feature values. This feature vector is processed by the machine learning model and an output prediction is made.

Adversarial Machine Learning

The increasing use of AI in safety and security critical systems has heightened concerns regarding the vulnerabilities AI introduces to such systems. One class of attacks on an AI is called an adversarial evasion attack. In such an attack, an adversary computes a precise set of input manipulations such that the perturbed input is misclassified. Such attacks threaten the reliability of AI systems as adversaries with sufficient access can control the output decisions of the classifier. Multiple work has been done in the prior art to mitigate the effect of adversarial evasion attacks, but few have succeeded. The main issue early adversarial defenses suffered was a reliance on gradient obfuscation, a technique that prevents a correct estimation of a classifier's loss gradient due to the use of non-differentiable operations. As early adversarial evasion attacks relied on the classifier's loss gradient to guide the adversarial image perturbations, gradient obfuscation based defenses appeared very effective at preventing adversarial evasion attacks. Unfortunately, gradient obfuscation can be easily bypassed through use of alternative gradient approximation methods.

As adversarial machine learning attacks have been traditionally studied in the context of image recognition, it is nontrivial to apply them elsewhere. In order to enable the study of adversarial machine learning in a more general context, there are three main challenges that need to be overcome: 1) non-differentiable feature extraction; 2) variable input types; and 3) input semantics and functionality preservation.

Non-Differentiable Feature Extraction. Most state-of-the-art adversarial evasion attacks generate adversarial inputs by computing the loss gradient with respect to the model's input and using the loss gradient to guide the adversarial modifications. Within the model, computing the loss gradient is straightforward as machine learning models are composed of differentiable layers necessary for backpropagation. The challenge arrives when the loss gradient must be back propagated through the feature extraction layer. In the image domain, there is little to no structural difference between the object (the original image) and its extracted features as both are arrays of continuous, numerical values. When input transformations are performed, they are often done for data augmentation purposes and are differentiable (e.g., shift and rotate). However, most other input objects are non-numerical, thus input transformations are required to obtain a numerical feature representation that the machine learning model can process. The difference in structure requires such transformations to be non-differentiable. As such the loss gradient cannot be backpropagated back to the input object preventing traditional attacks from generating adversarial example objects. Instead, existing attacks are limited to generating adversarial features.

Variable Input Types. In image recognition, the input object (an image) consists of an array of numerical, continuous values each sharing the same data type. In most domains, however, the input data types are variable. In malware detection, the input object may be a file binary. In Domain Generation Algorithm (DGA) detection, the input sample may be a string representing the domain name. In classification tasks with tabular datasets, the input object may be an array of mixed data types (e.g., numerical, categorical, text, etc.). As the task changes, the structure and data type(s) of the input object changes as well. This variability also extends to the input feature vector as the feature vector may consist of a mix of discrete and continuous numerical values that represent numerical quantities or preprocessed categorical features. Traditional adversarial attacks are not equipped to handle such varied input representations.

Input Semantics and Functionality Preservation. Images and their respective feature vector representations are simple inputs to adversarially modify because the modifications is a simple incremental addition of noise. Furthermore, the inputs usually consist of independent features, i.e., the value of one pixel is not affected by the value of other pixels in the image. Beyond clipping the input to ensure the features remain in a certain valid range, these properties allow existing adversarial attacks to largely ignore the need to preserve the input semantics or functionality of an image object. When considering adversarial modifications on general object types or feature representations, one or more embodiments of the present invention take these constraints into account. Otherwise, the generated adversarial inputs might be meaningless as they would represent impossible inputs or would change the original intent of the input.

Preliminary studies in adversarial machine learning on computer vision systems assumed strong threat models in which the adversary had full visibility into the AI system and the ability to manipulate the input at any point before it was provided to the model. One example of the prior art suggested that such a threat model was unrealistic in practice as an adversary with such high level access to the AI system could perform more damaging actions than just subtly manipulating model inputs. Furthermore, gaining such high privileged access would be difficult. In a weaker threat model in which the adversary can only manipulate the operational environment of an AI computer vision system, it has been demonstrated that there are additional environmental factors, which harden the task of adversarial evasion and prevent the success of existing adversarial attacks. However, once these environmental factors are taken into account as part of the attack pipeline, the adversarial attacks are successful once again.

Unified Attack Framework

In this section, a new and useful unified attack framework is described for enabling the generation of adversarial inputs irrespective of the input type and task domain. One or more embodiments of the present invention characterizes the adversarial generation process as a graph exploration problem in which a system seeks a sequence of edges from the original input vertex that results in a new vertex, but a different model prediction. One or more embodiments of the present invention employs a graph exploration approach for several reasons. First, inputs, which can either be objects or features, can have a variety of possible representations, but in the presently-described framework simply utilize graph vertices. Second, due to the variability in input representations, there is no fixed measure of distance between inputs. As the presently-described framework standardizes the input representation as a graph, the system presented herein defines the distance between inputs as the number of edges between their vertices as well as the traditional metrics for numeric features. Finally, the issue of non-differentiable feature extraction becomes irrelevant in the presently-presented framework as it only examines the output prediction and does not normally require any gradient computation with respect to the input.

One or more embodiments of the presently-presented and novel framework consists of two main steps: 1) Graph Definition 101 and 2) Graph Exploration 103, as shown in FIG. 1.

As shown in FIG. 1, graph definition 101 defines a graph G of possible inputs to the AI system and uses graph search algorithms 105 to discover adversarial examples in G. In graph exploration 103, the exploration graph search algorithms 105 visits a vertex, evaluates one or more of its edges, and applies the corresponding transformation transformations to reach a new vertex. This process is repeated with the selected neighbors. The sequence of edges that connect an input to an adversarial input dictates the order of input transformations to apply. A user defines the set of functionality preserving input transformations, which denote the types of directed edges E in the graph. The framework defines a graph G=(V, E) where the set of vertices V is all possible inputs. Note that this is a theoretical representation of the dynamic graph that one has to explore instead of building a static graph that enumerates all possible inputs since the number of such inputs is prohibitively large (e.g., for domain names, it is up to $\Sigma_{i=3}^{63} 36 \times 37^{i-1}$. Edges can represent a variety of object modifications such as changing a categorical value, manipulating a textual value (e.g., domain name lfjx.com 111 to lfjz.com 113), or directly modifying an executable file.

Once the framework defines G, one can apply graph search algorithms 105. One or more embodiments of the present invention consider three basic options: 1) exhaustive search, 2) greedy search, and 3) beam search. In exhaustive search, a system explores every single connected vertex and keep the most "adversarial" vertex at the end. In greedy search, a system only explores the vertex connected to the highest scoring edge, based on the edge weighting algorithm. In beam search, a system explores the vertices connected to top-k scoring edges and keep. Each algorithm has various advantages and disadvantages as the number of edge types increases. For example, as search depth increases, the storage cost of beam search increases. The success rate of greedy search can decrease due to the number candidate vertices being ignored.

Input Score Function 107 measures how close a given input (e.g., lfjz.com) is to being adversarial, and this is the basis of edge weights. One or more embodiments of the present invention use two different score functions: 1) feature vector similarity and 2) model loss. When a target adversarial feature vector is provided, one or more embodiments of the present invention scores the input based on the similarity between its respective feature representation and the adversarial feature vector. Adversarial feature vectors can be generated using existing adversarial evasion techniques. Alternatively, the classification loss for the input can be used if an adversarial feature vector is not provided.

When the search algorithm visits a new vertex, edge weighting 109 computes the weights of its edges based on their likelihood of leading to a potential adversarial input so that the search algorithm can prioritize the edges and continue exploration. A Brute-Force algorithm serves as the most basic approach in which the weight of each edge is computed from the incident vertex by applying the corresponding transformation and evaluating the input score function.

The Lookup Table approach lowers the computation cost of the Brute-Force approach by performing the Brute-Force algorithm on a small set of training samples before graph exploration. For each edge type, the average edge weight is computed over all training samples to build a lookup table. When the graph is explored, rather than applying the transformation and computing the weight for each edge, as in Brute-Force, the approach skips the actual transformation, but instead uses the lookup table to predict the weight of the edges. Though this approach is much faster during exploration, it does not consider the current vertex state, which means that the predicted edge score and true score may differ significantly.

Deep reinforcement learning approaches such as Deep Q Learning can learn a neural network that builds a lookup table dynamically based on the current vertex. This approach has faster running time than the Brute-Force approach, and higher success rate than Lookup Table by considering the current vertex. Furthermore, this approach can take the future reward into consideration so that it computes the weights based not just on the input score of the incident vertex, but also on the probability of finding edges with high weights in further explorations. In the implementation, one or more embodiments of the present invention first pre-trains the deep learning agent on a set of unlabeled test samples. Then, during exploration, one or more embodiments of the present invention uses the agent to score the next set of neighbors to explore.

Graph Exploration

With the graph defined, a graph exploration 103 algorithm is employed to discover an adversarial input in G based on the exploration objective. During exploration, starting at a vertex representing the current input, the algorithm evaluates the connecting edges (Edge weighting) and take an edge using the graph exploration method using graph search algorithms 105. Then, one or more embodiments of the present invention applies the transformation corresponding to the edge(s) to reach a new vertex and input state, and compute the score (Vertex Scoring). This process is repeated with the selected vertices until the exploration objective is satisfied (i.e., an adversarial input is found) or the exploration budget is exhausted (i.e., how long a graph is allowed to be traversed/examined). If the exploration objective has been satisfied, then the sequence of edges that connect the original input to the final vertex dictate the order of input transformations to apply to generate an adversarial input.

The framework implements three graph exploration algorithms by default during graph exploration: a) Exhaustive search; b) Beam search; and c) Simulated Annealing. This algorithm dictates, which neighboring vertices are propagated to the next epoch of exploration.

With exhaustive search, every single neighboring node is passed to the next epoch of exploration. This algorithm is the most likely to find a sequence of edges that result in an adversarial input if one exists within the budget. Therefore, its success rate is high, but the number of nodes explored in each epoch scales exponentially with respect to the number of edge types.

With beam search, only the top-k ranked edges are passed to the next epoch of exploration. This method is less computationally expensive than exhaustive search as a controlled number of vertices are passed each iteration. It also provides flexibility to the user as they can tune k to balance success rate and computational complexity.

The Simulated Annealing algorithm is essentially a temperature-guided random search algorithm. Unlike the other two graph exploration algorithms, the implementation does not require an edge weighting algorithm to be defined as it does not use the score of the connected vertices. During each exploration epoch, it randomly selects a random length sequence of edges starting from the current input vertex, evaluates the new input state, and then determines if the current input state should be kept based on the vertex's objective score and the current temperature. The temperature is a parameter that initially encourages exploration of new input states in the early phases of exploration. As time passes, the temperature gradually decreases, which discourages exploration and instead causes the algorithm to prefer to keep input states that better satisfy the exploration objective.

One or more embodiments of the present invention use two vertex scoring functions during graph exploration 103: 1) classifier loss and 2) feature distance. The scoring function informs the framework the "closeness" a vertex is achieving the objective. In general, the goal of the framework is to find a vertex that is adversarial, i.e., the vertex represents an input different from the original input, is within some number of hops away from the original vertex (or within some norm bound of the original input), and is misclassified by the classifier. The classifier loss scoring function is used when the objective is to maximize the classifier loss for the current input z as is done in traditional adversarial machine learning. Given a classifier F and the classifier's prediction on the original input y, one or more embodiments of the present invention scores the vertex belonging to z as follows:

$$score=L(F(z),y)$$

where L is the classifier's loss function. Traditionally, the cross entropy function is used. If the user desires to generate an adversarial input that is misclassified as a specific target label y, rather than a random label that is not y, one or more embodiments of the present invention modifies score=L(F(z),y) to minimize the loss with respect to the target label.

While the framework is capable of generating adversarial examples on its own, one or more embodiments of the present invention recognizes that some users of the framework would prefer to reuse existing adversarial evasion attacks. With such attacks, a user would first generate an adversarial feature vector as they cannot propagate the modifications through the feature extraction component. Then, the generated adversarial feature vector would be used by the framework as the exploration objective. The advantage of this approach is that the existing adversarial attacks are well studied for numerical input types and may provide better results than relying on the classifier loss in certain scenarios. The feature distance scoring function is used when the objective is to find to find an input z that when passed through feature extractor E is as close to the target features f as possible with respect to a distance function D. The vertex score is expressed as follows:

$$score=-D(E(z),f)$$

E(z) is the feature representation of z if z is an object. If z is already a feature vector, then E is the identity function. The negative sign ensures that closer inputs with respect to the target features are given higher scores. This second method has the possibility to result in the framework returning an input z that is not misclassified as some features f maybe not be achievable and it does not consider the classifier's prediction for z.

Semantic Correctness and Functionality

A key component of the framework is to ensure the semantic correctness and functionality of generated adversarial inputs. The framework defines modification functions, which one or more embodiments of the present invention denotes as input transformers, for a few basic input types: integers, floats, Booleans, strings, categorical values, and one-hot categorical values. These input types are often used in most AI systems, at least at the feature representation level, and they can be combined to obtain new input representations. Furthermore, for most of these input types, the constraints on semantic correctness and functionality are usually very simple to ensure. For example, given a vector of floats, e.g., representing an image, the constraints take the form of ensuring the floats are bounded in a certain range.

Due to the wide adoption of machine learning, there are a large number of task domains and variety of input types. Prior works in malware detection used custom modification functions tailored for the task domain and the framework expands on this approach. Rather than enumerating every possible input type, one or more embodiments of the present invention allows users to define new input transformations through an easy-to-use interface as users are likely to possess the necessary domain knowledge and understanding of input constraints. Through the interface, the user simply needs to define the transformation operation and, if necessary, methods to compute a set of possible transformations given an input value. Once defined, the framework automatically uses the transformations when encountering the respective input type. As the user provides the definition, the adversarial inputs generated by the framework will be semantically correct according to their definition.

Additionally, the framework also includes the ability for users to define individual constraints on an input value or, in the case of a vector with multiple input values, dependency constraints between input values. The Lp norm constraint used for image-based adversarial attacks is an example of an individual constraint for a float type of an input value. Another example is an edit distance for non-numerical inputs, such as strings. As inputs can have multiple representations, the definition of input transformations includes a function to enforce such constraints if necessary. After transforming an input, the framework checks if the user defines any dependency constraints as part of the attack. A dependency constraint is expressed as a function and multiple dependency constraints can be passed to the framework. For example, suppose that a framework has a feature vector of length three and the third index is computed by summing the first two indices. A user can express this relationship with a dependency function that takes in the current input state and the first two indices as input, sums their values, assigns it to the third index, and then returns the new input.

Evaluation

In this section, the present disclosure demonstrates how one or more embodiments of the present invention use the presently-described framework to perform adversarial attacks against three different machine learning tasks with different input types, semantics, and features. First, one or more embodiments of the present invention use two security critical machine learning tasks: malware classification and domain name generation algorithm (DGA) detection. Using a model trained on a malware classification dataset and malware samples the present inventors independently collected, one or more embodiments of the present invention highlight the flexibility of the framework as the present inventors expand the input transformation definitions to handle a more abstract input type, binary executable files. Using a set of non-DGA names collected from other sources, and DGA names over 5 years from a behavior-based DGA analytics engine, one or more embodiments of the present invention show a complete end-to-end demonstration of adversarial attacks in both the object space (i.e., domain name) and the feature space. Through a simple modification of the exploration objective, the framework can be combined with prior image-based adversarial attack algorithms to generate adversarial domain names. Furthermore, one or more embodiments of the present invention reuse the generated adversarial inputs to improve the adversarial robustness of the model.

Malware Classification

A first demonstration of one or more embodiments of the present invention uses a malware classification model trained on a known dataset to identify if an input is malware or goodware. This dataset is a collection of feature vectors extracted from numerous binary files with goodware/malware labels. The present inventors trained the model on 900,000 inputs in which one third of the training data is unlabeled. The remaining two thirds were labeled and balanced between malware and goodware. On the remaining 200,000 inputs, the accuracy of the classifier was 97%. The present inventors of the model also provide a binary feature extractor and SHA256 hashes of the dataset binaries so that the original binary files can be collected.

One or more embodiments of the present invention use file binaries as the input type for this task and rely on the provided feature extractor to preprocess the input objects. As the present framework only contains pre-defined input transformations for basic input types, one or more embodiments of the present invention define a new set of transformations for file binaries. One or more embodiments of the present invention implement six types of functionality-preserving transformations which modified the PE header: binary packing, adding sections, renaming sections, adding imports, removing debugging and signatures, and appending data. Each of these transformations does not affect the functionality or semantic correctness of the binary after modification.

For the demonstration, one or more embodiments of the present invention use the Reinforcement Learning algorithm and beam search to explore the graph. For the exploration objective, one or more embodiments of the present invention use a distance objective to highlight how existing adversarial attacks can be incorporated into the framework. Given the feature representation of a binary, one or more embodiments of the present invention first generate an adversarial feature vector using the HopSkipJump algorithm. One or more embodiments of the present invention set exploration objective to minimize the L2 distance between the feature vector generated by HopSkipJump and the current transformed binary's feature representation. The present inventors trained the agent on 12 benign binaries from an operating system. One or more embodiments of the present invention loop through the training set and apply up to three input transformations per sample until 175,000 total transformations have been performed. Although the number of training samples is low, the large number of input transformation combinations explored is sufficient to allow the agent was able to learn how each transformation and sequence of transform number affects the feature representation of the input.

After training the agent, one or more embodiments of the present invention evaluate its performance using 100 randomly picked malware samples. As the original dataset contains the extracted feature vectors, but not the original file binary, one or more embodiments of the present invention use the provided SHA256 hashes to obtain the original malware binaries. Of the 100 malware samples, the classifier labels 93 of them correctly. A baseline approach of applying up to 3 randomly chosen transformations generated only 1 successful adversarial malware binary that could deceive the classifier. The result reflects the fact that the increased entropy due to a random choice of transformations can make the generated examples more suspicious. In clear contrast, with the trained reinforcement learning (RL) agent, a beam search of width 5, and a transformation maximum of 3, the framework generated adversarial malware binaries for 38 of the samples. On average, the generation process takes about 90 s per sample as part of the generation process involves first running the HopSkipJump algorithm before exploring the graph.

Interested in the transferability of the adversarial malware samples, the present inventors also evaluated the performance of VirusTotal detectors on the original malware binaries and the adversarial malware binaries generated by the framework and the random baseline with up to 3 transformations. On the original malware binaries, the average detection rate across all the VirusTotal detectors was about 82%. However, on the adversarial malware binaries, the average detection rate falls to 58%. When one or more embodiments of the present invention examines the minimum detection rates, a drastic drop occurs in which one of the detectors only flagged 6% of the adversarial samples as malicious. When breaking down the precision and recall of several of the VirusTotal detectors, one or more embodiments of the present invention sees that in general, the adversarial manipulations, though they do not affect the functionality of the binary, can evade some of these detectors despite no interaction with these detectors. The present inventors can also see that even the best detectors can be deceived by some adversarial samples. These results are concerning as many organizations rely on the collective strength of VirusTotal to label the maliciousness of a binary and integrate VirusTotal into their threat management systems. However, one or more embodiments of the present invention have shown that a malicious actor can generate malware that may be mislabeled by VirusTotal without high level access to the detectors themselves.

DGA Classification

A second demonstration uses a domain name generation algorithm (DGA) classification model trained on an independently collected dataset. Given a domain name, the model predicts if the domain name is the result of a domain name generation algorithm or not. Domain name generation algorithms are used by malware to locate the command and control servers and avoid simple exempt listing. Instead of relying on fixed IP address or domain name hard-coded into the malware, domain name generation algorithms generate a large of number of domain names in a pseudorandom fashion, one of which connects to the actual command and control server. The present inventors built a feature extractor that generates 20 numerical bounded features from a domain name and fed this feature representation to a 2-layer neural network. This dataset contains 5,000 DGA names and 5,000 non-DGA names, both for training and testing. The accuracy of the classifier on the test dataset is 93%.

One or more embodiments of the present invention evaluates the success rate of each exploration algorithm. As a baseline comparison, the present inventors also include results with normal random exploration algorithm, which simply applies a random transformation at each epoch with possible early termination when it finds successful adversarial example during the search. To train the Lookup Table algorithm, the present inventors used 500 randomly selected samples from the training data. To train the Reinforcement Learning algorithm, the present inventors used all 10,000 training samples. The present inventors loop through the training set and apply up to three input transformations per sample until 80,000 total transformations have been performed. For all experiments, except for simulated annealing, the present inventors used the width 3 beam search and allow up to three input transformations during evaluation. The three transformation limit is an arbitrary setting to show the performance of the framework, even when only a small number of transformations are allowed. This number could be increased, which would likely improve the likelihood of generating successful adversarial inputs. As simulated annealing explores the graph in a random manner and keeps results based on the current temperate, the present inventors instead allow nine input transformations. In all algorithms, exploration will stop early if a successful adversarial example was found.

The present inventors discovered new and useful results for generating adversarial example objects when the exploration objective is based on the classifier's loss. To manipulate the input objects, a text string representing the domain name, the present inventors defined three input transformations: add, delete, and replace an alphanumeric character. After modification, the present inventors extract the domain name's feature representation and provide it to the classifier. From the results, the present inventors saw that the Brute-Force algorithm is the slowest of the ranking algorithms, but also has the highest success rate. The Lookup table algorithm has the lowest success rate as it ranks edges based on prior history rather than based on the current input state. The Reinforcement Learning and Simulated Annealing algorithms provide a balance with respect to their success rate and exploration time. The Reinforcement Learning algorithm results in finding adversarial samples with fewer transformations than the Simulated Anneal algorithm as its ranking model considers higher order correlations involving multiple transformations on the input object to produce the desired outcome.

As the present inventors showed in the malware demonstration, the present framework can be combined with existing adversarial attacks to generate adversarial samples. Here, the present inventors used the Projected Gradient Descent attack to generate adversarial features as the model's features are numerical and continuous. The present inventors use an L2 distance metric to define the exploration objective. The present inventors also set a modification constraint specifying that a feature can be only modified by up to 30% of the feature's maximum value in order to mimic the inconspicuousness property image-based adversarial attacks enforce. This constraint is not strictly necessary and relaxing this constraint would further improve the generation success rate. The framework uses the same three transformations as in the prior experiment and checks if the modifications result in an extracted feature representation that is closer to the generated adversarial feature vector. Exploration is terminated early if the current input is adversarial. As before, the Brute-Force algorithm is the slowest algorithm and the Lookup Table is the least successful of the algorithms. Overall, the present inventors notice that the success rate of generating adversarial example objects is also much lower. This is likely because although the adversarial feature vector causes misclassification, it may not be realizable in the object domain.

Previously, the present inventors showed two different approaches to generate adversarial example objects, either using a classifier loss objective or a distance objective with an intermediate adversarial feature vector. The present inventors observe that, for all algorithms except Reinforcement Learning, using the classifier loss is more likely to result in finding an adversarial example than using the feature distance objective. As the feature vectors are typically much higher dimensional than the classifier's output prediction, the non-Reinforcement Learning algorithms may have difficultly identifying the next transformation that is likely to achieve the exploration objective in future exploration steps.

In this last experiment, the present inventors used the present framework to generate adversarial features using the classifier loss objective. The exploration parameters for each algorithm remain the same. As the features are all numerical, continuous values, the present inventors do not need to define any new input transformations. The present inventors select all of the available features as possible modification candidates and define a modification constraint such that a feature can only be modified by at most 30% of the feature current value. The present inventors define the constraint based on the current value because unlike image inputs, numerical features are unbounded so the present inventors consider the "inconspicuousness" of a modification to depend on the original value of the feature. Again, defining such a constraint is not necessary depending on the user requirements, but the present inventors use it here to demonstrate frame-work's capabilities. As the present inventors are directly modifying and evaluating inputs in the feature space, the success rate of the three non-random ranking algorithms is much higher. Simulated Annealing, however, has a much worse performance, likely due to the much larger search space that results from the continuous nature of the features. Increasing the search time for the Simulated Annealing algorithm would likely improve its performance.

As the present framework enables the generation of adversarial inputs regardless of the task or input type, the present inventors now have additional methods to improve classifier's robustness towards such inputs. Adversarial training hardens classifiers against adversarial inputs by generating adversarial inputs and training the classifier using the generated inputs. As prior adversarial attacks were restricted to generating adversarial features, adversarial training could not be used effectively. The present framework, though, enables adversarial training as the present inventors can generate adversarial example objects. The present inventors report the performance of the DGA classifier when trained using standard training and adversarial training. Thus, using adversarial example objects has a minimal impact on natural accuracy, but greatly improves the adversarial accuracy of the classifier.

Non-Image Domain Evasion Attacks

Recently, attacks specifically designed for some of non-image domains are proposed. Grosse et al. proposed a method that refactors the Jacobian Saliency Map Attack (JSMA) so adversarial cybersecurity objects could be created. They used a set of binary indicator features to represent an input malware sample. If a binary feature was one, then the sample was said to exhibit that feature. With the feature representation of the malware sample, the attack was able to compute Jacobian Saliency map of the sample and use it to identify feature indices that would most likely cause adversarial classification. As the feature representation was interpretable, the changes could be reproduced on the malware sample. To preserve functionality, adversarial modifications were only made to zero-valued features. That is to say, the adversarial attack would only add new capabilities rather than remove it. This approach has been leveraged by other works as well.

The limitation of works that adapt existing image-based adversarial attacks to new domains is that often these adaptations only work if the features are interpretable and if the features are independent (i.e., changing one feature does not affect another feature). When such conditions hold, the adversarial feature modifications provide guidance as to how a system might modify the input object to cause misclassification, but often these conditions are hard to fulfill. To this end, several works explored methods to directly generate adversarial cybersecurity objects. Rather than reusing existing adversarial attacks, these works first defined a set of functionality preserving input object transformations and then attempted to determine a sequence of transformations to apply that cause misclassification.

These approaches are implemented for a specific task in mind to achieve a high attack success rate for that task. In contrast, the goal is designing a framework that can be easily adapted to any input object type and model by identifying the key modules and few custom transformations.

The vulnerability of AI systems to adversarial machine learning motivates a need for tools that enable proper study. As traditional adversarial attacks were designed for image-based systems, strict assumptions regarding input structure have been made. Prior works that have attempted to solve this issue were too focused on designing a new adversarial attack rather than designing a new platform upon which adversarial attacks can be built on top of and studied. In this paper, the present inventors proposed a new framework able that can be used to generate adversarial examples for AI systems regardless of the modality or task. The present inventors formulate the process a graph exploration problem and define edges between nodes based on a user defined set of input transformations. The present framework searches for the sequence of edges that result in satisfying the exploration object, e.g., finding an adversarial input. As the present inventors allow the definition of an input transformation to be general, the framework can modify inputs regardless of their representation, whether it be a vector of basic data types (e.g., numerical, categorical, string) or an abstract object (e.g., file binary). The functionality and semantic correctness of generated inputs are guaranteed so long as the user has properly defined the input transformations to be safe. The present inventors demonstrated the capabilities of the framework in generating adversarial inputs on three different machine learning tasks with very different input representations. Despite non-differentiable components in the classification pipeline (i.e., the feature extractor), which normally prevents the use of traditional adversarial attacks, the framework remained able to generate semantically correct adversarial inputs. The present inventors also highlighted the security and non-security benefits of generating adversarial samples using the design.

Figure 2:
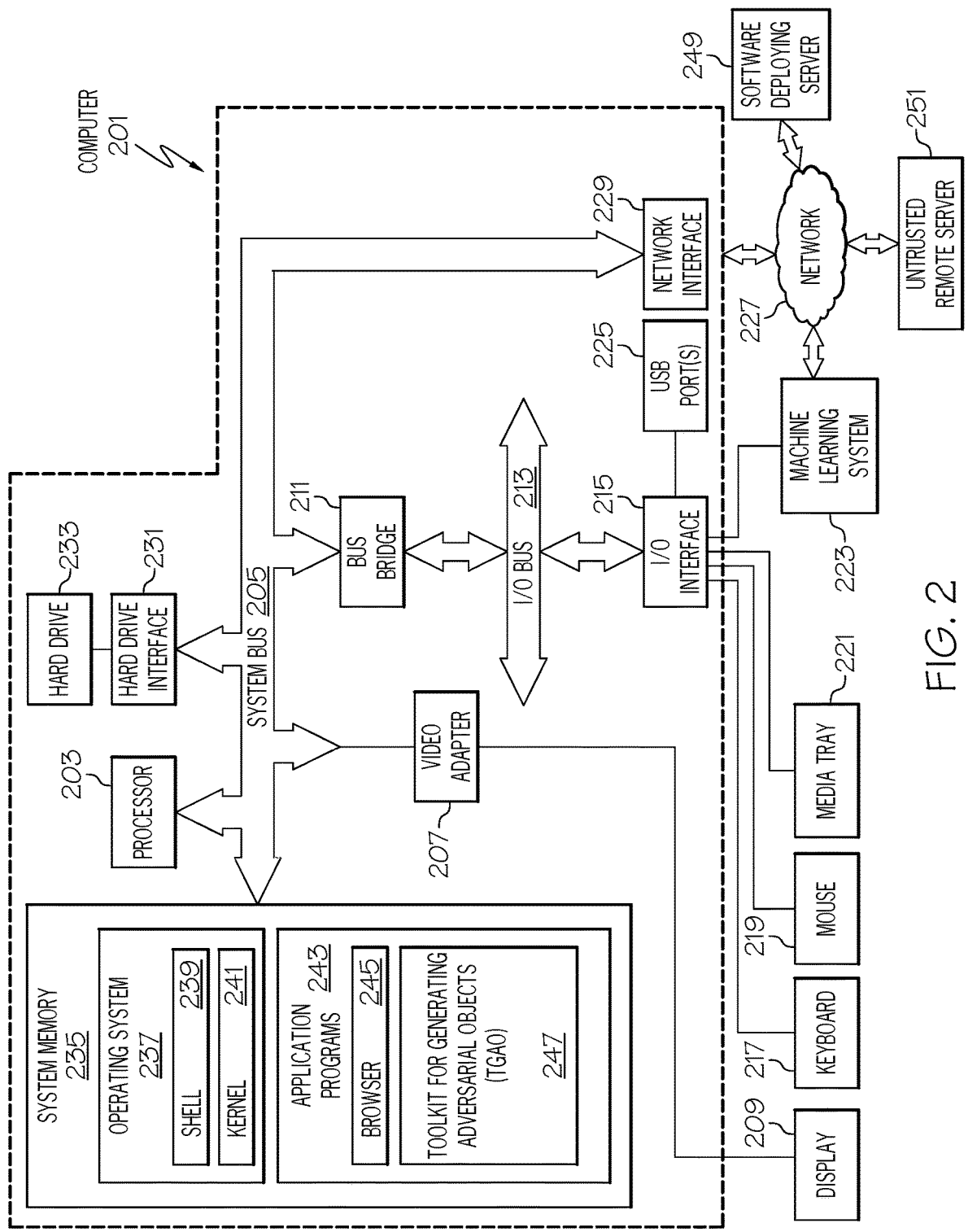
FIG. 2 depicts an exemplary system and network in which the present disclosure may be implemented.

With reference now to FIG. 2, there is depicted a block diagram of an exemplary system and network that may be utilized by and/or in the implementation of one or more embodiments of the present invention. Note that some or all of the exemplary architecture, including both depicted hardware and software, shown for and within computer 201 may be utilized by machine learning system 223 and/or software deploying server 249 and/or untrusted remote server 251 shown in FIG. 2, and/or other processing devices depicted in other figures associated with one or more embodiments of the present invention.

Exemplary computer 201 includes a processor 203 that is coupled to a system bus 205. Processor 203 may utilize one or more processors, each of which has one or more processor cores. A video adapter 207, which drives/supports a display 209, is also coupled to system bus 205. System bus 205 is coupled via a bus bridge 211 to an input/output (I/O) bus 213. An I/O interface 215 is coupled to I/O bus 213 I/O interface 215 affords communication with various I/O devices, including a keyboard 217, a mouse 219, a media tray 221 (which may include storage devices such as CD-ROM drives, multi-media interfaces, etc.), and external USB port(s) 225. While the format of the ports connected to I/O interface 215 may be any known to those skilled in the art of computer architecture, in one or more embodiments of the present invention some or all of these ports are universal serial bus (USB) ports.

As depicted, computer 201 is able to communicate with a network 227 using a network interface 229. Network interface 229 is a hardware network interface, such as a network interface card (NIC), etc. Network 227 may be an external network such as the Internet, or an internal network such as an Ethernet or a virtual private network (VPN).

A hard drive interface 231 is also coupled to system bus 205. Hard drive interface 231 interfaces with a hard drive 233. In one or more embodiments of the present invention, hard drive 233 populates a system memory 235 which is also coupled to system bus 205. System memory is defined as a lowest level of volatile memory in computer 201. This volatile memory includes additional higher levels of volatile memory (not shown), including, but not limited to, cache memory, registers and buffers. Data that populates system memory 235 includes computer 201's operating system (OS) 237 and application programs 243.

OS 237 includes a shell 239, for providing transparent user access to resources such as application programs 243. Generally, shell 239 is a program that provides an interpreter and an interface between the user and the operating system.

More specifically, shell 239 executes commands that are entered into a command line user interface or from a file. Thus, shell 239, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 241) for processing. Note that while shell 239 is a text-based, line-oriented user interface, one or more embodiments of the present invention will equally well support other user interface modes, such as graphical, voice, gestural, etc.

As depicted, OS 237 also includes kernel 241, which includes lower levels of functionality for OS 237, including providing essential services required by other parts of OS 237 and application programs 243, including memory management, process and task management, disk management, and mouse and keyboard management.

Application programs 243 include a renderer, shown in exemplary manner as a browser 245. Browser 245 includes program modules and instructions enabling a world wide web (WWW) client (i.e., computer 201) to send and receive network messages to the Internet using hypertext transfer protocol (HTTP) messaging, thus enabling communication with software deploying server 249, untrusted remote server 251 and other computer systems.

Application programs 243 in computer 201's system memory also include a Toolkit for Generating Adversarial Objects (TGAO) 247. TGAO 247 includes code for implementing the processes described below, including those described in FIGS. 3-8. In one or more embodiments of the present invention, computer 201 is able to download TGAO 247 from software deploying server 249, including in an on-demand basis, wherein the code in TGAO 247 is not downloaded until needed for execution. Note further that, in one or more embodiments of the present invention, software deploying server 249 performs all of the functions associated with the present invention (including execution of TGAO 247), thus freeing computer 201 from having to use its own internal computing resources to execute TGAO 247.

The untrusted remote server 251 is a server that attacks an existing process model with an adversarial object, which appears to be similar to an object used by the existing process model, but in fact is different.

Note that the hardware elements depicted in computer 201 are not intended to be exhaustive, but rather are representative to highlight essential components required by one or more embodiments of the present invention. For instance, computer 201 may include alternate memory storage devices such as magnetic cassettes, digital versatile disks (DVDs), Bernoulli cartridges, and the like. These and other variations are intended to be within the spirit and scope of the present invention.

In one or more embodiments of the present invention, artificial intelligence in the form of a neural network is used to generate and/or affirm the form of an adversarial object.

A neural network, as the name implies, is roughly modeled after a biological neural network (e.g., a human brain). A biological neural network is made up of a series of interconnected neurons, which affect one another. For example, a first neuron can be electrically connected by a synapse to a second neuron through the release of neurotransmitters (from the first neuron) which are received by the second neuron. These neurotransmitters can cause the second neuron to become excited or inhibited. A pattern of excited/inhibited interconnected neurons eventually lead to a biological result, including thoughts, muscle movement, memory retrieval, etc. While this description of a biological neural network is highly simplified, the high-level overview is that one or more biological neurons affect the operation of one or more other bio-electrically connected biological neurons.

An electronic neural network similarly is made up of electronic neurons. However, unlike biological neurons, electronic neurons in certain electronic neural networks are never technically "inhibitory", but are only "excitatory" to varying degrees. In other electronic neural networks, however, electronic neurons are capable of inhibitory signals, which reduce the ability of a follow-on neuron to produce a positive output.

Figure 3:
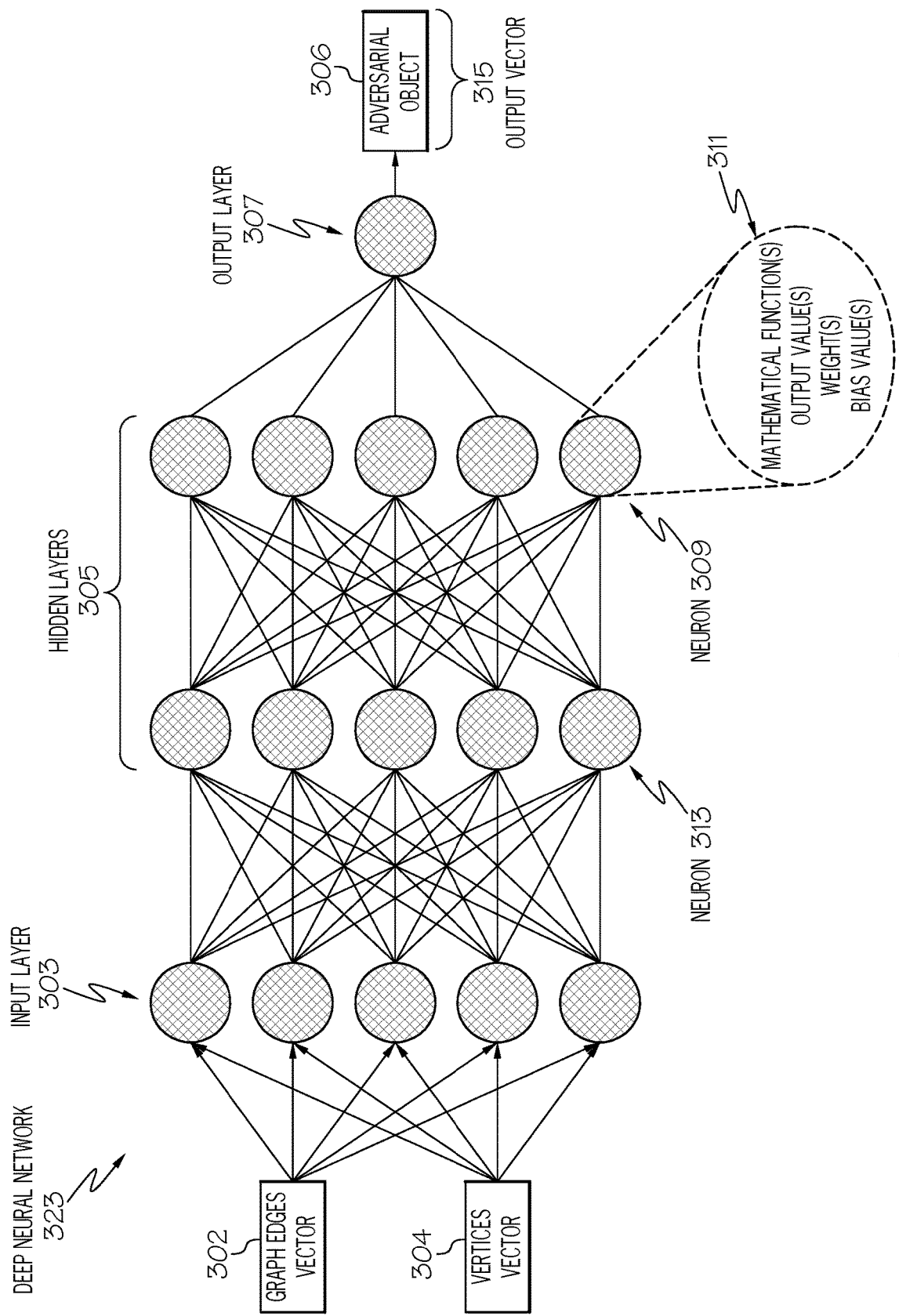
FIG. 3 depicts an overview of a deep neural network (DNN) that is used in one or more embodiments of the present invention.

With reference now to FIG. 3, one type of neural network used in one or more embodiments of the present invention is a deep neural network (DNN), such as the depicted deep neural network (DNN) 323 (analogous to the machine learning system 223 shown in FIG. 2), as shown in FIG. 3.

In one or more embodiments of the present invention, DNN 323 is used in one or more embodiments of the present invention when generating an adversarial object and/or affirming that a particular adversarial object is appropriate for a particular process model when used to harden that particular process model against vulnerabilities.

In a deep neural network (DNN), neurons are arranged in layers, known as an input layer, hidden layer(s), and an output layer. The input layer includes neurons/nodes that take input data, and send it to a series of hidden layers of neurons, in which neurons from one layer in the hidden layers are interconnected with neurons in a next layer in the hidden layers. The final layer in the hidden layers then outputs a computational result to the output layer, which is often a single node for holding vector information.

With further reference now to FIG. 3, DNN 323 is used to generate an adversarial object 306 based on an input of a graph edges vector 302 that describes graph edges in a particular process model, and a vertices vector 304, which describes vertices in that particular process model. Furthermore, the DNN 323 is trained to produce a known adversarial object 306 by using various instances of graph edges vectors 302 and vertices vectors 304, and then adjusting the nodes to produce a known adversarial object 306.

As shown in FIG. 3, the electronic neurons in DNN 323 are arranged in layers, known as the input layer 303, hidden layers 305, and an output layer 307. The input layer 303 includes neurons/nodes that take input data, and send it to a series of hidden layers of neurons (e.g., hidden layers 305), in which neurons from one layer in the hidden layers are interconnected with neurons in a next layer in the hidden layers 305. The final layer in the hidden layers 305 then outputs a computational result to the output layer 307, which is often a single node for holding vector information that describes the output vector 315 (e.g., the adversarial object 306). In an embodiment of the present invention, each neuron in the output layer 307 is associated with a particular output vector 315.

As just mentioned, each node in the depicted DNN 323 represents an electronic neuron, such as the depicted neuron 309. Each node can be a processing unit (e.g., a microprocessor, a computer, etc.), another DNN, a convolutional neural network (CNN), a recurrent neural network (RNN), a quantum computer, etc. As shown in block 311, each neuron (including exemplary neuron 309) includes at least four features: a mathematical function, an output value, a weight, and a bias value.

The mathematical function is a mathematic formula for processing data from one or more upstream neurons. For example, assume that one or more of the neurons depicted in the middle hidden layers 305 sent data values to neuron 309. Neuron 309 then processes these data values by executing the mathematical function shown in block 311, in order to create one or more output values, which are then sent to another neuron, such as another neuron within the hidden layers 305 or a neuron in the output layer 307. Each neuron also has a weight that is specific for that neuron and/or for other connected neurons. Furthermore, the output value(s) are added to bias value(s), which increase or decrease the output value, allowing the DNN 311 to be further "fine-tuned".

For example, assume that neuron 313 is sending the results of its analysis of a piece of data to neuron 309. Neuron 309 has a first weight that defines how important data coming specifically from neuron 313 is. If the data is important, then data coming from neuron 313 is weighted heavily, and/or increased by the bias value, thus causing the mathematical function (s) within neuron 309 to generate a higher output, which will have a heavier impact on neuron(s) in the output layer 307. Similarly, if neuron 313 has been determined to be significant to the operations of neuron 309, then the weight in neuron 313 will be increased, such that neuron 309 receives a higher value for the output of the mathematical function in the neuron 313.

Alternatively, the output of neuron 309 can be minimized by decreasing the weight and/or bias used to affect the output of neuron 309. These weights/biases are adjustable for one, some, or all of the neurons in the DNN 323, such that a reliable output will result from output layer 307. Such adjustments are alternatively performed manually or automatically.

When manually adjusted, the weights and/or biases are adjusted by the user in a repeated manner until the output from output layer 307 matches expectations. For example, assume that DNN 323 is being trained to generate a particular topology vector. As such, when input layer 303 receives the inputs from a known vertex vector whose last two entries are known to describe an age of a VM described in a graph database, then DNN 323 (if properly trained by manually adjusting the mathematical function(s), output value(s), weight(s), and biases in one or more of the electronic neurons within DNN 323) outputs a correct vector 315 (e.g., the appropriate second order topology vector 306) to the output layer 307.

When automatically adjusted, the weights (and/or mathematical functions) are adjusted using "back propagation", in which weight values of the neurons are adjusted by using a "gradient descent" method that determines which direction each weight value should be adjusted to.

Figure 4:
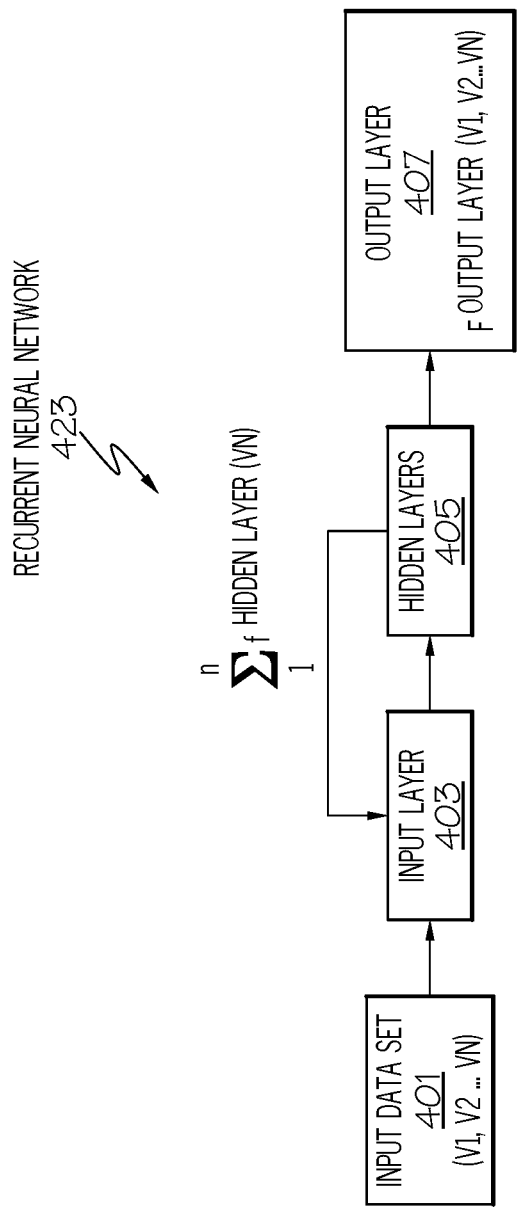
FIG. 4 illustrates an exemplary recurrent neural network used in one or more embodiments of the present invention.

With reference now to FIG. 4, an exemplary Recurrent Neural Network (RNN) 423, which uses a form of back propagation, is used to generate adversarial objects vectors in one or more embodiments of the present invention.

As shown in FIG. 4, an input data set 401 is a series of vertex vectors (e.g., graph edges vector 302 and vertices vector 304 shown in FIG. 3), depicted as v1, v2 ... vn. Input data set 401 is entered into an input layer of RNN 423, which passes the data from input data set 401 to an input layer 403, and then on to hidden layers 405 for processing. As the name recurrent neural network infers, an output from the hidden layers 405 for a current vector (e.g., $f(v_1)$) is fed back to the input layer 403, such that the current output for the current vector $f(v_1)$ is combined with a next input vector (e.g., $v_2$) to create a new output from the hidden layers 405 (e.g., $f(v_1+v_2)$). This process repeats until all vectors from the input data set 401 and their precursive processing results are processed, resulting in an output to the output layer 407, shown as $f^{output\ layer}(v_1, v_2 \ldots v_n)$.

Figure 5:
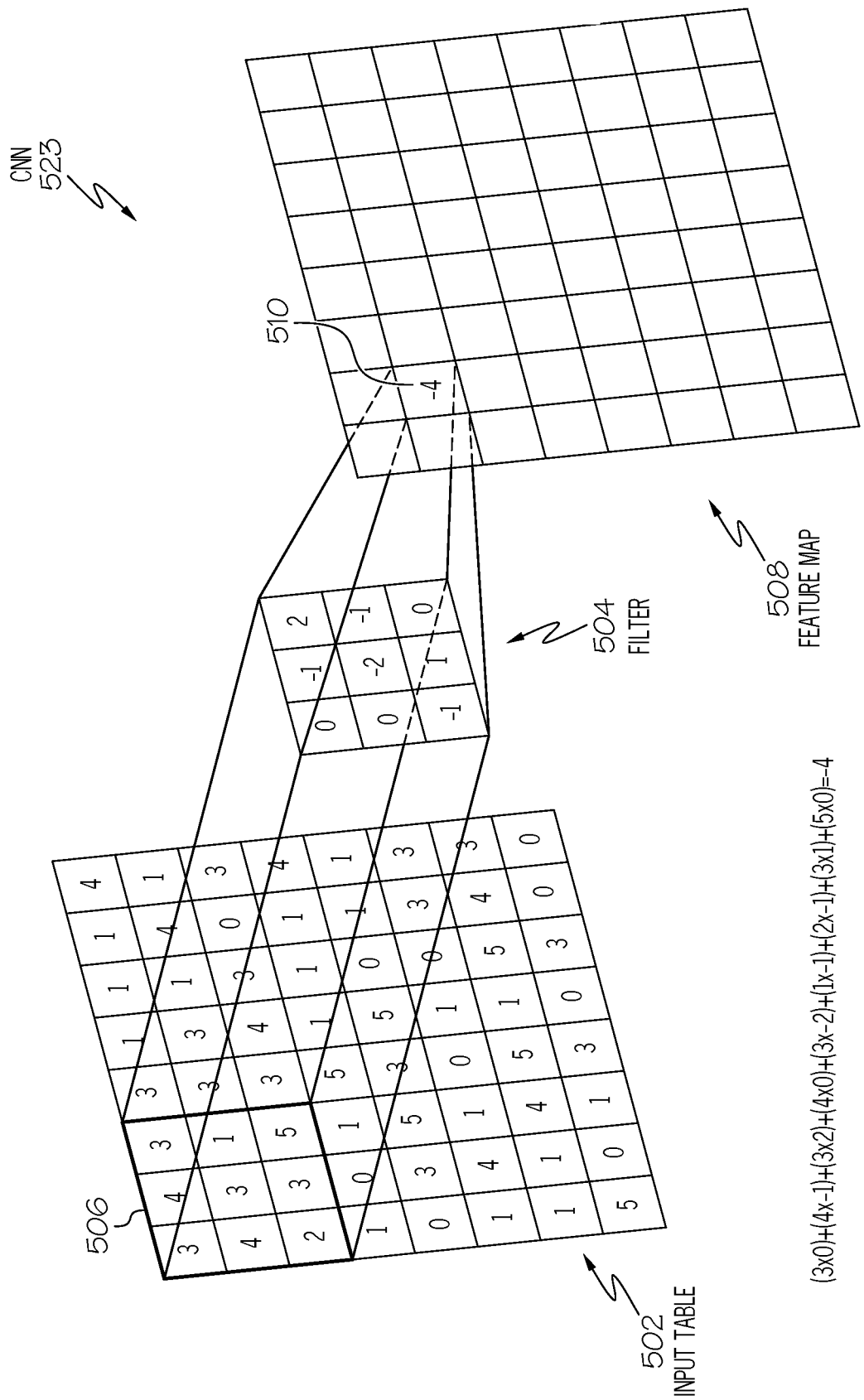
FIG. 5 and FIG. 6 illustrate a convolutional neural network (CNN) that is used in one or more embodiments of the present invention.
Figure 6:
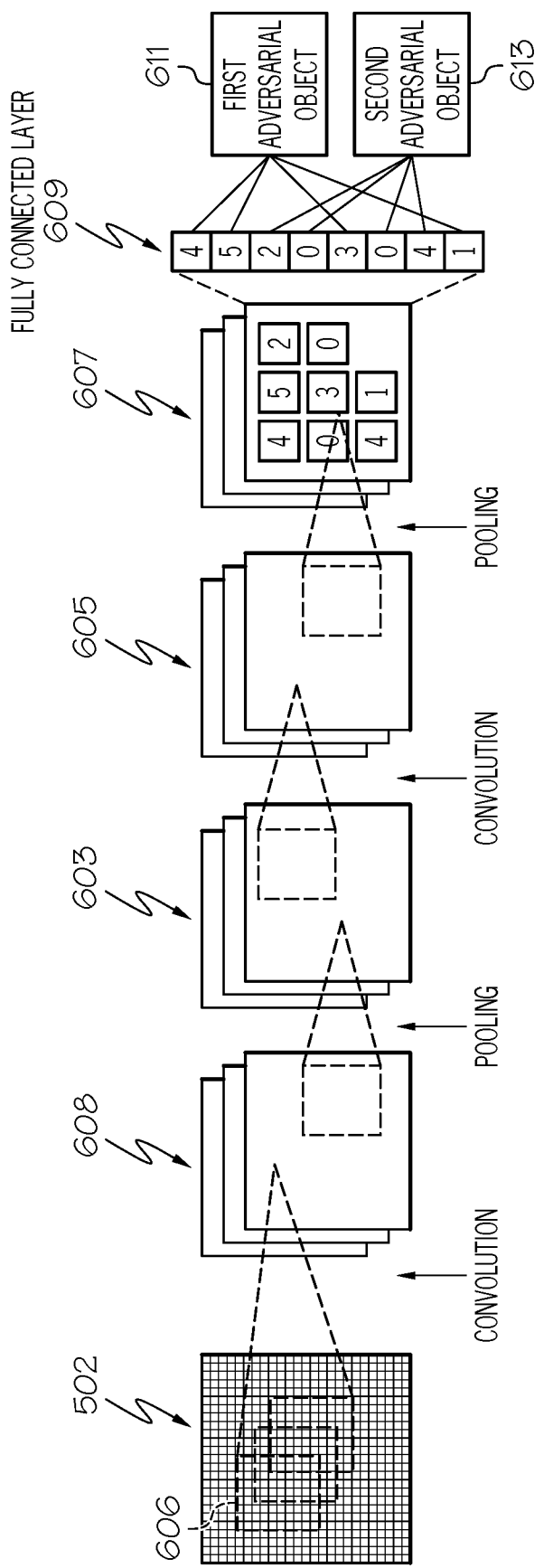

In one or more embodiments of the present invention, a convolutional neural network (CNN) or a graph neural network (GNN) is used to identify and return vertices and/or metadata from a graph database, as described in FIG. 5 and FIG. 6.

A CNN is similar to a DNN in that both utilize interconnected electronic neurons, such as those described in FIG. 3. However, a CNN is different from a DNN in that 1) a CNN has neural layers whose sizes are based on filter sizes, stride values, padding values, etc. (see FIG. 5) and 2) utilize a convolution scheme to analyze binary data (see FIG. 6). A CNN gets its "convolutional" name based on a convolution (i.e., a mathematical operation on two functions to obtain a result) of filtering and pooling binaries data (a mathematical operation on two functions) in order to generate a predicted output (obtain a result).

CNNs are normally used to evaluated images in order to identify unknown objects depicted in those images. However, one or more embodiments of the present invention provides a new, useful, and nonobvious use of a CNN to evaluate binaries from vectors that describe vertices and/or edge metadata in a graph database.

As described herein, a CNN process includes 1) a convolution stage (depicted in detail in FIG. 5), followed by a 2) pooling stage and a classification stage (depicted in FIG. 6).

With reference now to FIG. 5, a convolution scheme to analyze operating system binaries is presented in a CNN convolution process performed by a CNN 523. As shown in FIG. 5, binary data from vertex vectors and/or edge metadata populates an input table 502. Each cell in the input table 502 represents a value (e.g., a value between 0 and 9) that describe different vertices and/or edge metadata (referred to collectively as binary sets). A subset of the input table 502 is associated with a filter 504. That is, filter 504 is matched to a same-sized subset of binary sets (e.g., binaries subset 506) by sliding the filter 504 across the input table 502. The filter 504 slides across the input grid at some predefined stride (i.e., one or more binary units, each of which is depicted as a single cell). Thus, if the stride is "1", then the filter 504 slides over in increments of one (column) of binary sets. In the example shown in FIG. 5, this results in the filter 504 sliding over the subset of binary sets shown as binaries subset 506 (3, 4, 3, 4, 3, 1, 2, 3, 5 when read from left to right for each row) followed by filter sliding over the subset of binary sets just to the right of (4, 3, 3, 3, 1, 3, 2, 5, 3). If the stride were "2", then the next subset of binary sets that filter 504 would slide to would be (3, 3, 1, 1, 3, 3, 5, 3, 4), etc.

Filter 504 is applied against each binaries subset using a mathematical formula. That is, the values in the filter 504 are added to, subtracted to, multiplied by, divided by, or otherwise used in a mathematical operation and/or algorithm with the values in each subset of binary sets. For example, assume that the values in filter 504 are multiplied against the binary values shown in binaries subset 506 ((3x0)+(4x−1)+(3x2)+(4x0)+(3x−2)+(1x−1)+(2x−1)+(3x1)+(5x0)) to arrive at the value of −4. This value is then used to populate feature map 508 with the value of −4 in cell 510. This value of −4 thus describes a particular portion of the graph database, based on the vectors that represent vertices and edge metadata from that portion of the graph database.

In one or more embodiments of the present invention, the convolution step also includes use of an activation function, which transforms the output of the convolution operation into another value. One purpose of the use of an activation function is to create nonlinearity in the CNN. A choice of specific activation function depends on an embodiment. Popular choices of an activation function include a rectified linear unit (ReLU), a leaky ReLU, a sigmoid function, a tan h function, and so on.

In an embodiment, each subset of binary sets uses a same filter. However, in one or more embodiments of the present invention, the filter used by each subset of binary sets is different, thus allowing a finer level of granularity in creating the feature map.

With reference now to FIG. 6, the pooling stage and a classification stage (as well as the convolution stage) of a CNN 523 during inference processing is depicted. That is, once the CNN is optimized by adjusting the stride of movement of the binaries subset 506 (see FIG. 5), and/or by adjusting the filter 504 shown in FIG. 5, then it is trusted to be able to recognize similar graph database binaries. This optimized CNN is then used to infer (hence the name inference processing) which operating system created the compiled binaries shown in input table 502.

Thus, as shown in FIG. 6, assume that binary sets from input table 502 from a graph database are used as inputs to CNN 523, using a CNN that has been previously defined and optimized to recognize vectors and/or edge metadata in graph databases. Assume further that a series of binaries subsets, including the binaries subset 606 (analogous to binaries subset 506 shown in FIG. 5) are convolved (using the process described in FIG. 5), thus resulting in a set of feature maps 608 (analogous to feature map 508 shown in FIG. 5). Once the feature maps 608 are generated, they are pooled into smaller pooled tables 603, in order to reduce the dimensionality of the values, thereby reducing the number of parameters and computations required in the CNN process. Once these pooled tables 603 are created, they themselves are then convoluted to create new (and even more compressed) feature maps 605, which are then pooled to create even more compressed pooled tables 607.

The pooled tables 607 (which in an embodiment is actually a single table) is "unrolled" to form a linear vector, shown in FIG. 6 as a fully connected layer 609, which provides an, such as the first adversarial object 611 and the second adversarial object 613, which are candidate adversarial objects for a particular process model or other graph/ model.

In one or more embodiments of the present invention, a graph neural network (GNN) is used to identify an answer to a query that includes one or more vertices from a graph database and metadata from one or more edges in the graph database. The process used in a GNN is similar to that of the CNN described in FIG. 5 and FIG. 6. The difference between a GNN and a CNN is that a GNN uses the topology, nodes, and edges directly from a graph database, and maps different sections of the graph database in a convolutional manner similar to that used by a CNN.

Figure 7:
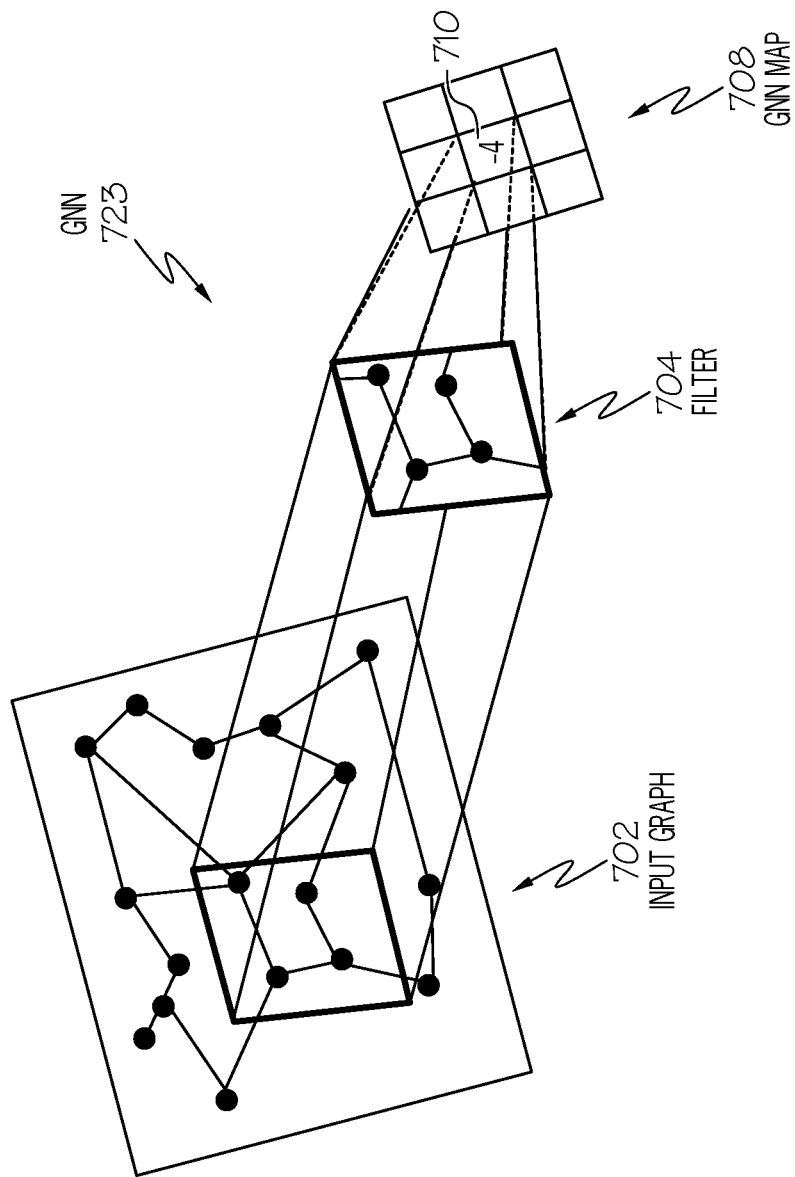
FIG. 7 depicts a high-level overview of a graph neural network (GNN) that is used in one or more embodiments of the present invention.

With reference then to FIG. 7, an exemplary GNN 723 that is used in one or more embodiments of the present invention to generate an example adversarial object is depicted.

Rather than using an input table of binaries (such as input table 502 shown in FIG. 5), GNN 723 directly analyzes an input graph 702 that is a graph database that represents a particular process model. A filter 704 slides/strides across the input graph 702 to create a GNN map 708, similar to the process describe in FIG. 5 for a CNN. The various strides by the filter 704 are then convoluted using a similar process to that describe in FIG. 6 to generate exemplary adversarial objects used to train that graph database. That is, the GNN 723 uses both a graphical topology, as well as underlying features of vertices and edges, to evaluate each part of the input graph 702 as defined by the filter 704.

While the description above describes the use of a DNN, RNN, CNN, or GNN when performing certain functions associated with the present invention, in one or more embodiments of the present invention any type of machine learning (artificial intelligence) can be used to perform described functions associated with the present invention.

Figure 8:
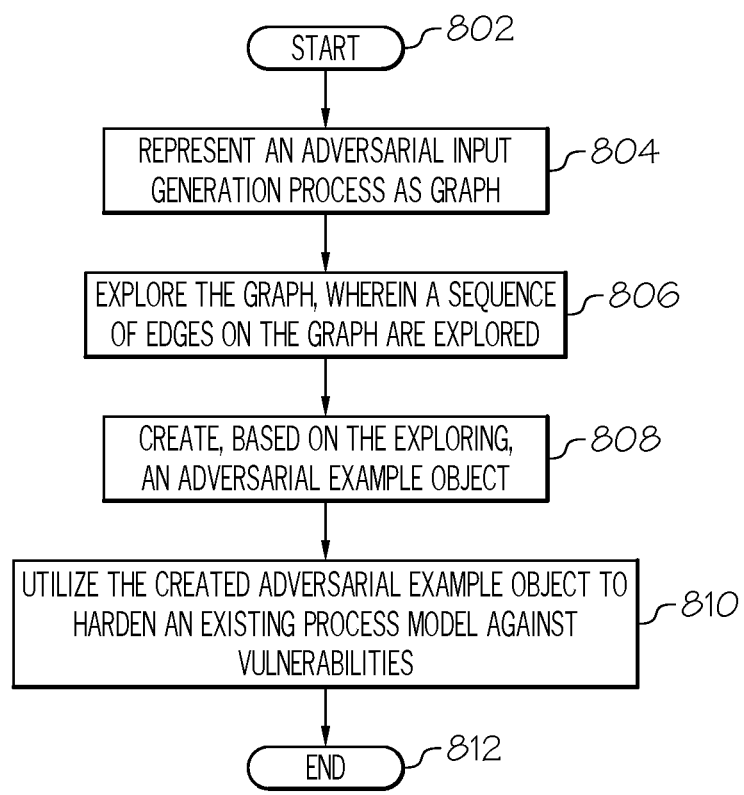
FIG. 8 is a high-level flow-chart of one or more operations performed in one or more embodiments of the present invention.

With reference now to FIG. 8, a high-level flow-chart of one or more operations performed in one or more embodiments of the present invention for generating and utilizing an adversarial generation toolkit is presented.

After initiator block 802, one or more processors represent an adversarial input generation process as a graph, as shown in block 804.

As shown in block 806, the processor(s) explore the graph, where a sequence of edges on the graph are explored (e.g., are traversed).

As shown in block 808, the processor(s) create, based on the exploring, an adversarial example object (e.g., by creating and/or identifying a node in the graph that represents/ depicts/describes the adversarial example object).

As shown in block 810, the processor(s) utilize the created adversarial example object to harden an existing process model against vulnerabilities (e.g., by teaching the existing process model how to recognize adversarial objects).

The flow-chart ends at terminator block 812.

As described herein, in one or more embodiments of the present invention the created adversarial example object is an object that is created directly from the exploring the graph.

As described herein, in one or more embodiments of the present invention the created adversarial example object is a new object that is created by comparing the created adversarial example object to an independently computed target adversarial example object.

As described herein, in one or more embodiments of the present invention the created adversarial example object and the independently computed target adversarial example object are expressed as vectors, and the method further comprises utilizing an input scoring function to compare the created adversarial example object to the independently computed target adversarial example object, where the input scoring function compares feature vector similarities between the created adversarial example object to the independently computed target adversarial example object.

As described herein, in one or more embodiments of the present invention, the method further comprises utilizing an input scoring function to compare the created adversarial example object to the independently computed target adversarial example object, where the input scoring function utilizes losses of nodes in the graph.

As described herein, in one or more embodiments of the present invention edges of the graph are weighted according to a likelihood of creating an adversarial example object.

As described herein, in one or more embodiments of the present invention, the method further comprises using the adversarial example object to train a machine learning process.

As described herein, in one or more embodiments of the present invention the adversarial example object is an adversarial cybersecurity object.

It is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
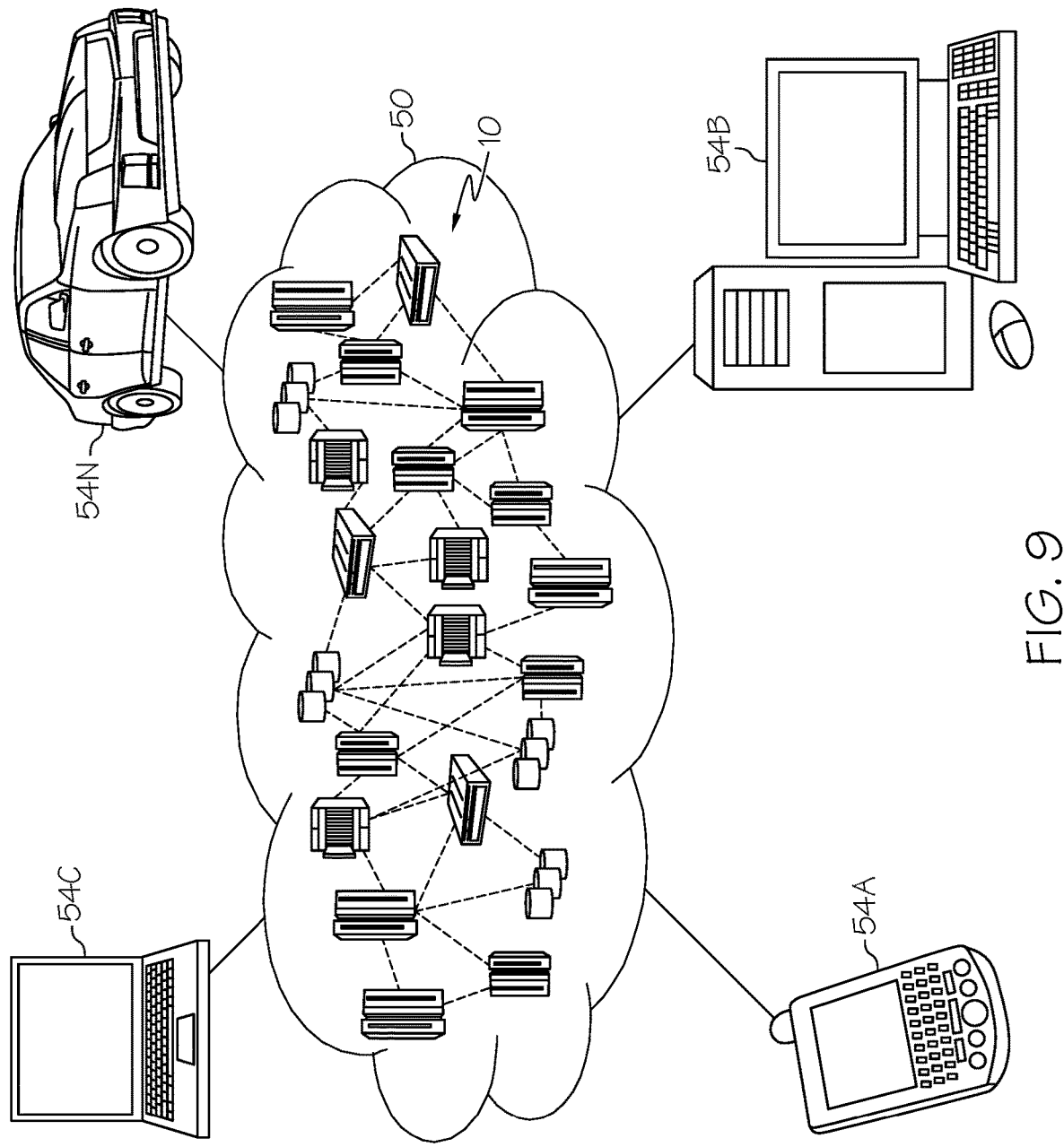
FIG. 9 depicts a cloud computing environment according to an embodiment of the present invention.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 9 are intended to be illustrative only and that computing nodes 10 and cloud computing environment 50 can communicate with any type of computerized device over any type of network and/or network addressable connection (e.g., using a web browser).

Figure 10:
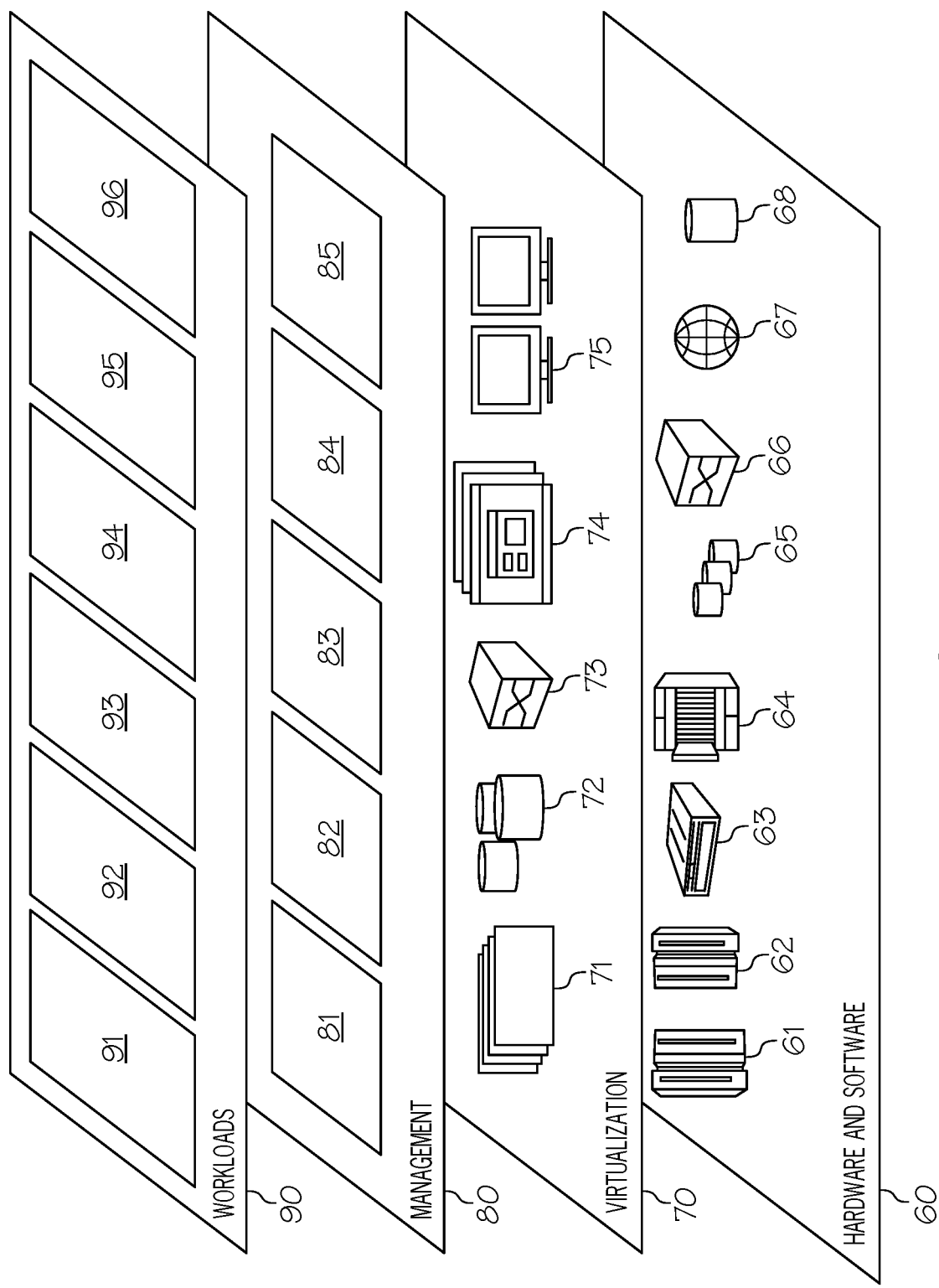
FIG. 10 depicts abstraction model layers of a cloud computer environment according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and adversarial object generation and utilization processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method for adversarial example object generation comprising:
   representing an adversarial input generation process as a graph, wherein the graph is generated from an input object;
   exploring the graph to identify a potential adversarial example object, wherein a sequence of edges on the graph are explored by:
      applying a transformation to an edge of the sequence of edges that corresponds to the edge, and
      computing a weight for the edge based on a likelihood of the transformation to the edge leading to the potential adversarial example object, where the transformation to the edge is functional and semantically correct for the potential adversarial example object;
   creating, based on the exploring, an adversarial example object that corresponds to the potential adversarial example object; and
   utilizing the created adversarial example object to harden an existing process model against vulnerabilities.

2. The method of claim 1, wherein the created adversarial example object is an object that is created directly from the exploring the graph.

3. The method of claim 1, wherein the created adversarial example object is a new object that is created by comparing the created adversarial example object to an independently computed target adversarial example object.

4. The method of claim 3, wherein the created adversarial example object and the independently computed target adversarial example object are expressed as vectors, and wherein the method further comprises:
   utilizing an input scoring function to compare the created adversarial example object to the independently computed target adversarial example object, wherein the input scoring function compares feature vector similarities between the created adversarial example object to the independently computed target adversarial example object.

5. The method of claim 3, further comprising:
   utilizing an input scoring function to compare the created adversarial example object to the independently computed target adversarial example object, wherein the input scoring function utilizes losses of nodes in the graph.

6. The method of claim 1, further comprising:
   using the adversarial example object to train a machine learning process.

7. A computer program product for adversarial example object generation, wherein the computer program product comprises a non-transitory computer readable storage device having program instructions embodied therewith, the program instructions readable and executable by a computer to perform a method comprising:
   representing an adversarial input generation process as a graph, wherein the graph is generated from an input object;
   exploring the graph to identify a potential adversarial example object, wherein a sequence of edges on the graph are explored by:
      applying a transformation to an edge of the sequence of edges that corresponds to the edge, and
      computing a weight for the edge based on a likelihood of the transformation to the edge leading to the potential adversarial example object, where the transformation to the edge is functional and semantically correct for the potential adversarial example object;
   creating, based on the exploring, an adversarial example object that corresponds to the potential adversarial example object; and
   utilizing the created adversarial example object to harden an existing process model against vulnerabilities.

8. The computer program product of claim 7, wherein the created adversarial example object is an object that is created directly from the exploring the graph.

9. The computer program product of claim 7, wherein the created adversarial example object is a new object that is created by comparing the created adversarial example object to an independently computed target adversarial example object.

10. The computer program product of claim 9, wherein the created adversarial example object and the independently computed target adversarial example object are expressed as vectors, and wherein the method further comprises:
   utilizing an input scoring function to compare the created adversarial example object to the independently computed target adversarial example object, wherein the input scoring function compares feature vector similarities between the created adversarial example object to the independently computed target adversarial example object.

11. The computer program product of claim 9, wherein the method further comprises:
utilizing an input scoring function to compare the created adversarial example object to the independently computed target adversarial example object, wherein the input scoring function utilizes losses of nodes in the graph.

12. The computer program product of claim 7, wherein the method is provided as a service in a cloud environment.

13. A computer system comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method comprising:
representing an adversarial input generation process as a graph, wherein the graph is generated from an input object;
exploring the graph to identify a potential adversarial example object, wherein a sequence of edges on the graph are explored by:
applying a transformation to an edge of the sequence of edges that corresponds to the edge, and
computing a weight for the edge based on a likelihood of the transformation to the edge leading to the potential adversarial example object, where the transformation to the edge is functional and semantically correct for the potential adversarial example object;
creating, based on the exploring, an adversarial example object that corresponds to the potential adversarial example object; and
utilizing the created adversarial example object to harden an existing process model against vulnerabilities.

14. The computer system of claim 13, wherein the created adversarial example object is an object that is created directly from the exploring the graph.

15. The computer system of claim 13, wherein the created adversarial example object is a new object that is created by comparing the created adversarial example object to an independently computed target adversarial example object.

16. The computer system of claim 13, wherein the method further comprises:
utilizing an input scoring function to compare the created adversarial example object to an independently computed target adversarial example object, wherein the input scoring function utilizes losses of nodes in the graph.

17. The computer system of claim 13, wherein the method is provided as a service in a cloud environment.

* * * * *